Figure 1:
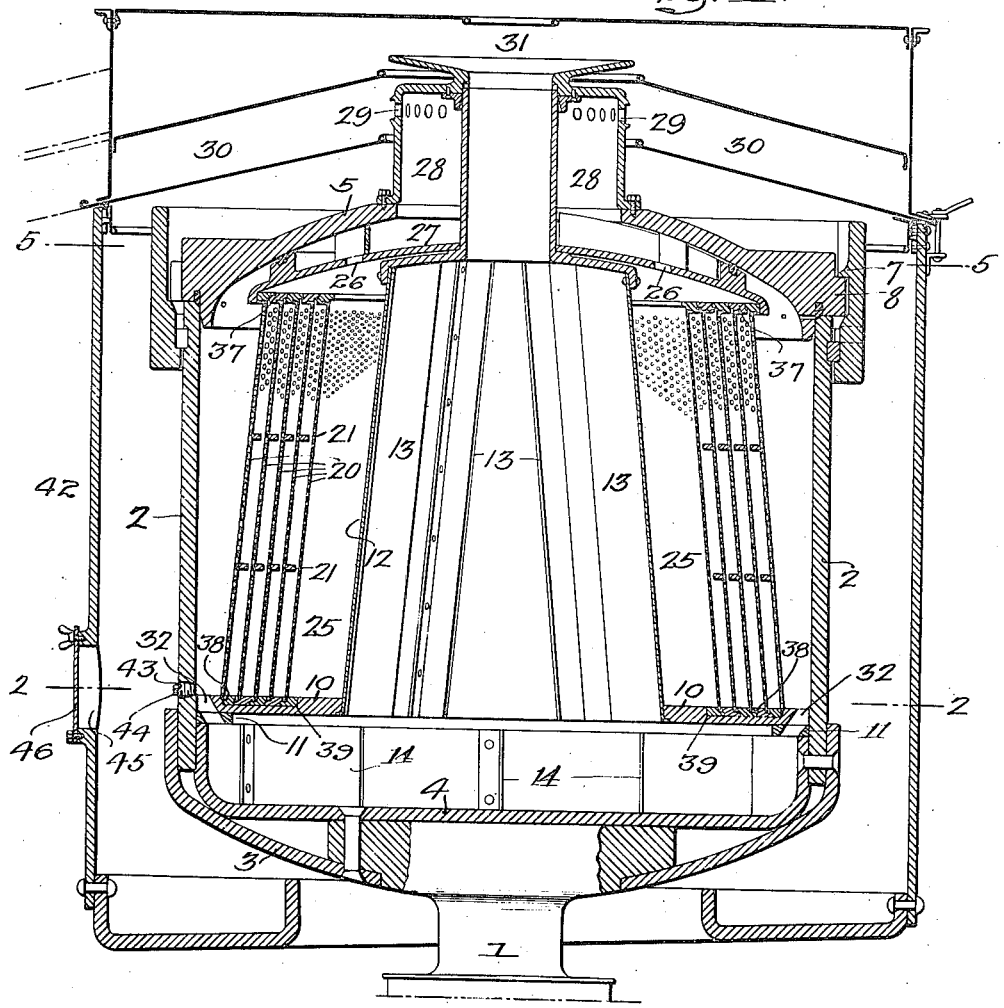
Figure 6:
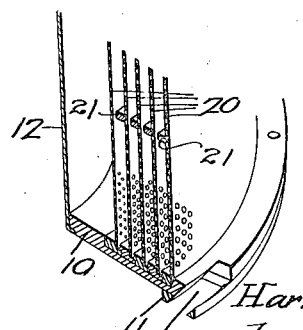

H. C. CHRISTIANSON.
CENTRIFUGAL FILTER.
APPLICATION FILED FEB. 21, 1914.

1,194,275. Patented Aug. 8, 1916.
4 SHEETS—SHEET 1.

Witnesses—

Inventor—
Harry C. Christianson.
by his Attorneys.
Howson & Howson

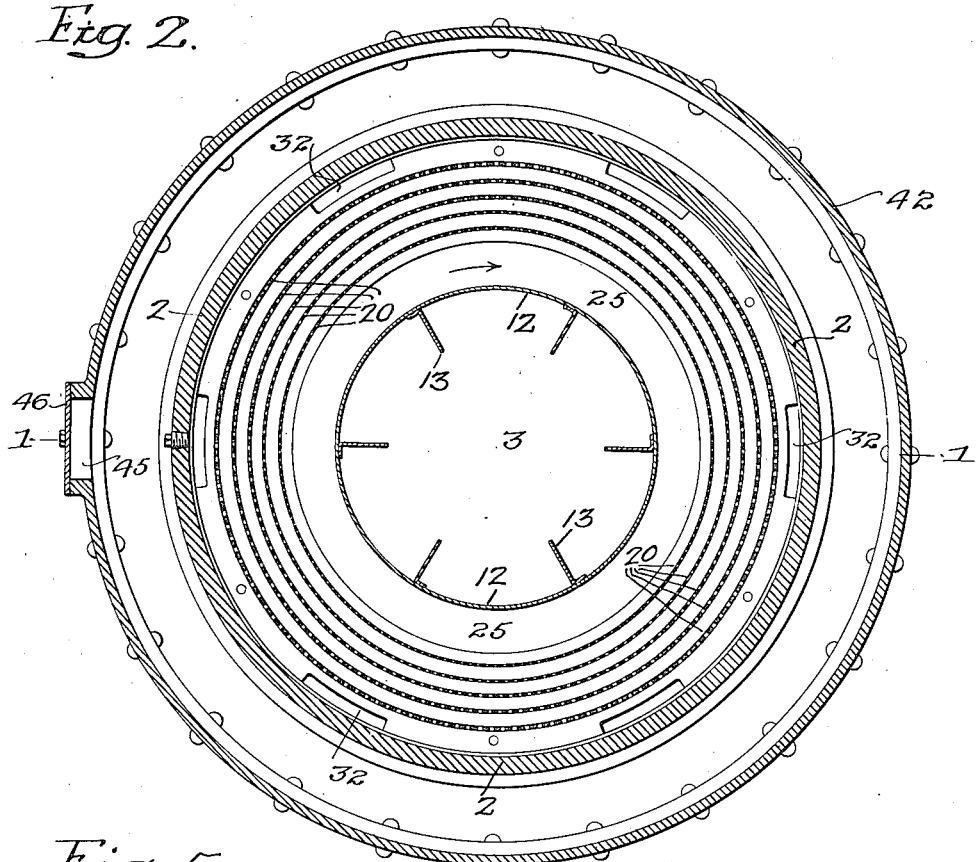
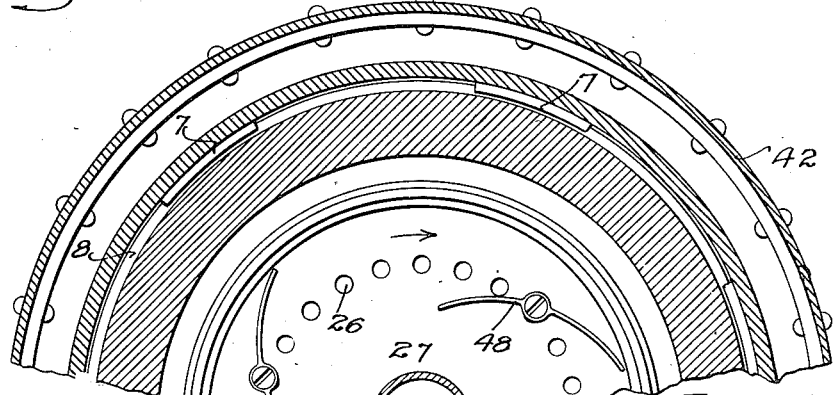

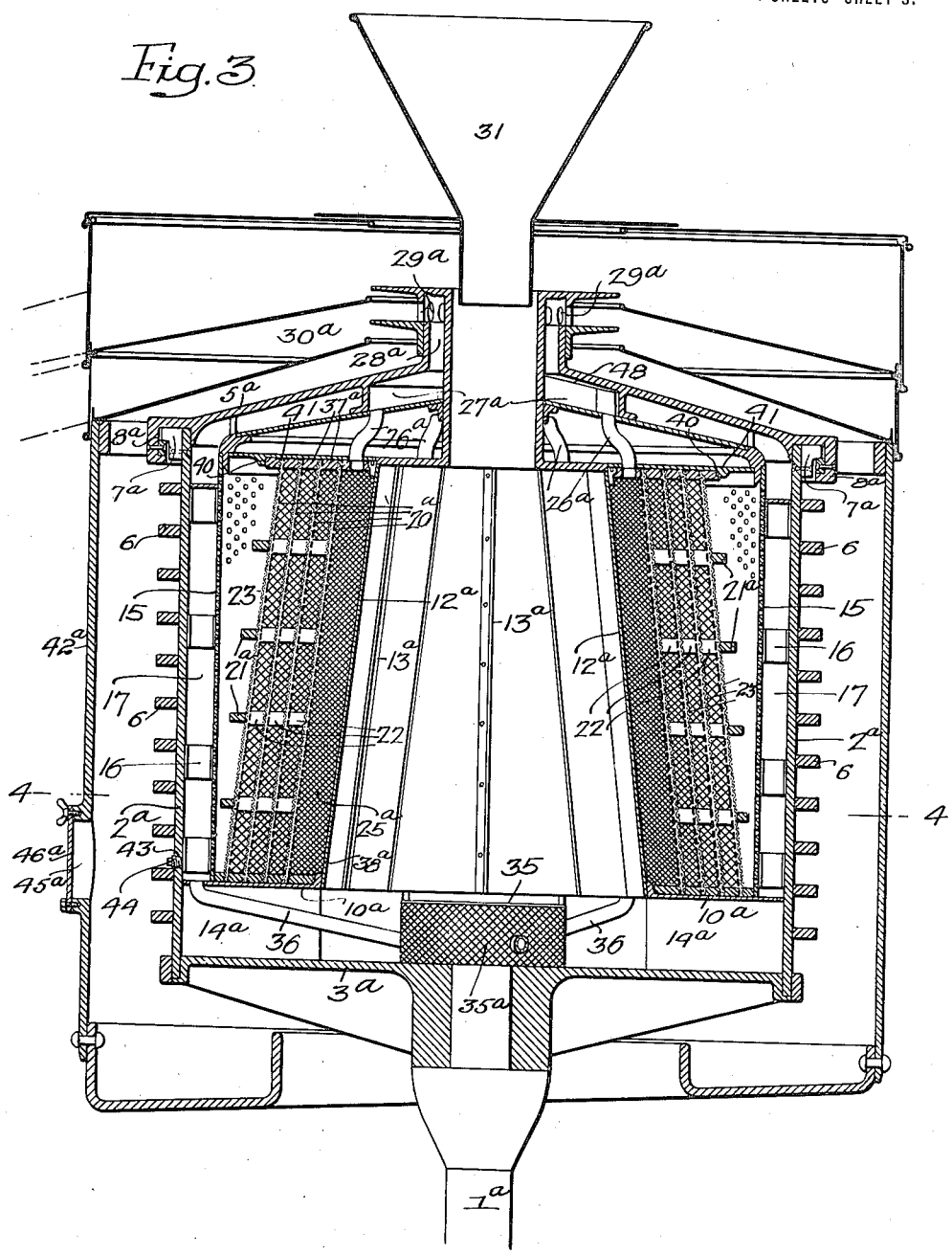

H. C. CHRISTIANSON.
CENTRIFUGAL FILTER.
APPLICATION FILED FEB. 21, 1914.

1,194,275.

Patented Aug. 8, 1916.
4 SHEETS—SHEET 4.

Witnesses—

Inventor—
Harry C. Christianson.
by his Attorneys
Howson & Howson

UNITED STATES PATENT OFFICE.

HARRY C. CHRISTIANSON, OF RIDGEWOOD, NEW JERSEY.

CENTRIFUGAL FILTER.

1,194,275. Specification of Letters Patent. Patented Aug. 8, 1916.

Application filed February 21, 1914. Serial No. 820,190.

*To all whom it may concern:*

Be it known that I, HARRY C. CHRISTIANSON, a citizen of the United States, and a resident of Ridgewood, Bergen county, New Jersey, have invented certain Improvements in Centrifugal Filters, of which the following is a specification.

My invention relates to the purification or separation and filtration of various kinds of liquids containing solids or matters of differing specific gravities wherein either the solids or other materials in suspension or solution, or the liquid content of the material operated upon, may be the final product sought to be attained.

The main object of my invention is to effect such separation, purification or filtration by the aid of centrifugal force and the pressure of the liquid passing through an apparatus in which such centrifugal force is utilized in a novel manner or method whereby the action of the apparatus employed is greatly enhanced and its capacity for continuous operation materially increased.

A further object of my invention is to provide an improved form of centrifugal filter or separator that shall be substantially self-cleansing.

My improved process, and the filter or separator in which it is carried out is available for employment in the separation of solids and other matters in suspension or solution from liquids or liquors of various kinds and characters, sugar solution, tan bark liquor, liquids containing carbonate of soda, or phosphate of lime, &c.

Among the important features or objects of my invention, the following may be mentioned: The employment in a centrifugal apparatus of a plurality of reticulated or foraminous baskets in which the movement of the material is inward or toward the axis of rotation and not outward; which baskets may be conical so that each basket will have a different peripheral speed at top and bottom, or straight and having the same peripheral speed at top and bottom; to axially mount such baskets in nested form in the bowl of the centrifugal; to introduce the material to be treated to a central chamber of the bowl from which it passes by gravity to a lower chamber and from which it is carried by centrifugal force to the outer wall of the bowl where it is subjected to the greatest peripheral speed of said bowl, and then to cause such liquid to pass inwardly and upwardly successively through said several foraminous or reticulated baskets by the pressure exerted by the weight of the mass of material normally filling the apparatus when under full load and against the force exerted by centrifugal action. This arrangement is most valuable for the treatment of liquid bodies containing solid ingredients of value or impurities to be removed, in suspension or solution, which various ingredients or bodies may have different specific gravities; for I am enabled to effect what may be termed "fractional separation" of the different solids, in solution or suspension, contained within the liquid under treatment. For instance, at the outer wall of the bowl where the greatest peripheral speed is attained and to which the material undergoing treatment is first presented, the greater bulk of the impurities or heavier content thereof will be removed. From this point, the partially filtered or separated liquid rises and is forced by pressure due to the weight of the incoming liquid to pass through a plurality of chambers formed by the reticulated or foraminous walls of a nest of baskets, conical or vertical as the case may be. The first chamber has a peripheral speed less than the peripheral speed of the bowl, and solids contained within the partially treated liquid reaching this point will be caught by the perforated wall forming the same, and by reason of the centrifugal force, such solids will be deposited against the inner surface of the perforated wall; the liquid passing to the next chamber. The liquid material under treatment passes thence to the next chamber formed by the reticulated or foraminous wall of the next basket, having a peripheral speed less than the first chamber where it is subject to the same conditions but in less degree. This basket, traveling at a rate of speed less than that of the first basket, will collect other suspended matters, which will be deposited by the action of centrifugal force against the inner surface of the same and adjacent the bottom. In like manner the liquid passes successively to the several chambers between the successive baskets, having successively reduced peripheral speeds, and the reticulated or foraminous walls of such baskets will remove the different suspended solids; the cleansed or separated liquid being finally discharged from the chamber within the inner basket nearest the axis of rotation.

If desired, the reticulated or foraminous walls of the several baskets may have different sized meshes or apertures; being successively smaller from the outer to the inner basket. If desired, the several reticulated or foraminous baskets may be provided with filtering media disposed externally of the same and held thereto by suitable means. Such filtering media may be the ordinary filter cloths usually employed with filter presses, and if desired these cloths may differ in mesh progressively from the outer to the central basket; the latter having the finer mesh.

Figure 4:
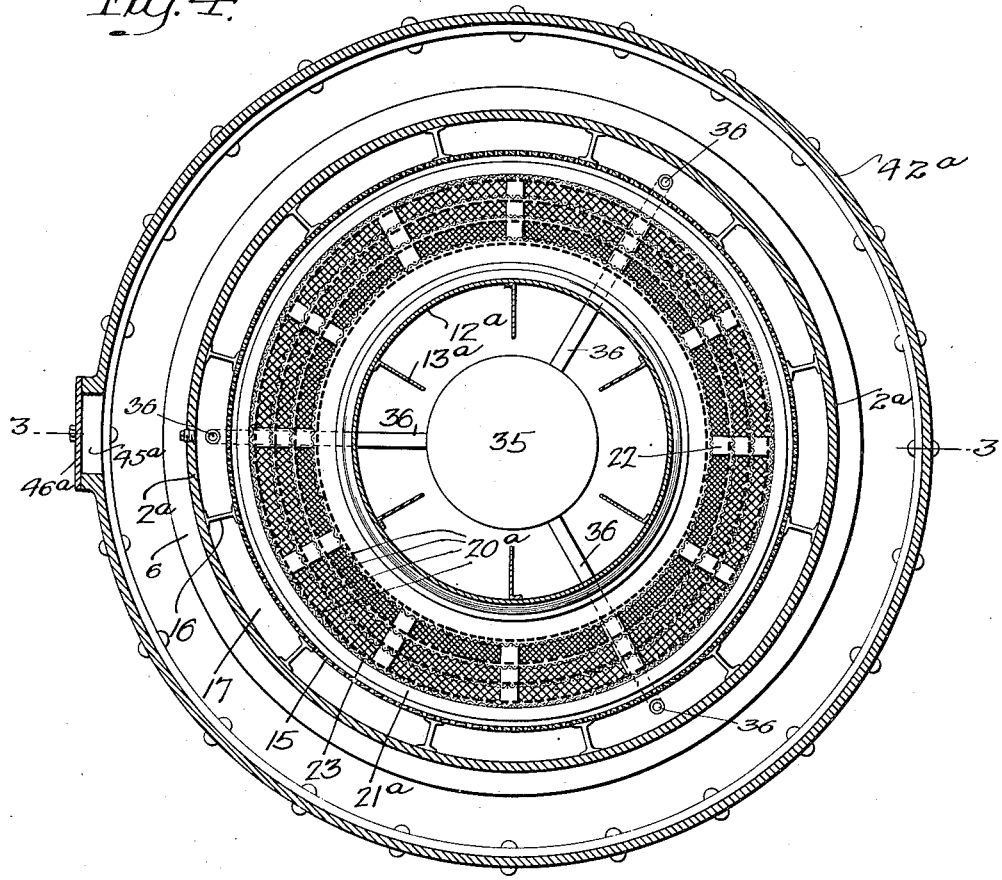
Figure 7:
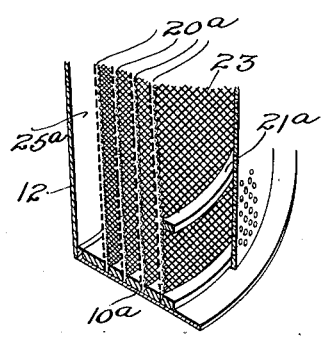

These and other features of my present invention, which involves the process as well as the apparatus in which such process is carried out, are more fully described hereinafter, reference being had to the accompanying drawings, in which:

Figure 1, is a sectional elevation of one form of separating structure capable of carrying out my improved process, taken on the line 1—1, Fig. 2; Fig. 2, is a sectional plan view of the same, taken on the line 2—2, Fig. 1; Fig. 3, is a sectional view similar to Fig. 1, illustrating a modified construction within the scope of my invention, taken on the line 3—3, Fig. 4; Fig. 4, is a sectional view taken on the line 4—4, Fig. 3, and Figs. 5, 6 and 7, are sectional views illustrating details of my invention.

In the drawings, 1 represents a suitable shaft or support, which may be driven by a steam turbine or other means which will impart movement thereto at a high rate of speed and this shaft carries the bowl of the centrifugal. As shown in Fig. 1, this bowl is made up of a shell 2 having a bottom 3, which is directly secured to said shaft, a false bottom 4, which forms the actual bottom of the bowl, and a cover 5. The shell is preferably provided with lugs 7 at the top of the same to engage flanges 8 of the cover 5 whereby the latter may be held in place; removal of such cover being permitted by slightly rotating the same to free its flanges from engagement with said lugs.

Within the main bowl, a secondary bowl is placed, having a bottom 10 spaced above the false bottom 4, which bottom 10 may be supported by an annular flanged wall of said bottom 4; a spacing ring 11 being interposed between the bottom and said flange. The secondary bowl has a solid inner wall 12, preferably conical in shape; being inclined outwardly from top to bottom and having a plurality of vanes 13, and vanes 14 may be disposed in the lower part of the main bowl.

Within the secondary bowl, in the space between the wall 2 thereof and the inner solid wall 12, a plurality of reticulated or foraminous baskets 20 are placed, which baskets are nested one within the other; the several baskets being stayed against destruction by centrifugal force by annular bands 21 disposed on the inner surfaces of the same. The bracing or staying means for the respective baskets are spaced apart from the adjoining baskets for the free passage of the liquid being filtered or separated. The baskets shown in Fig. 1, are inclined outwardly from top to bottom at substantially the same angle as the solid inner wall 12 of the secondary bowl. In some instances they may be vertical.

Each of the foraminous nested baskets may carry a layer of filtering media, which may be filter cloths of the type usually employed, which filtering media lies on the outside of said baskets and toward the point from which the liquor enters the same.

Between the innermost basket and the central solid wall 12 of the secondary bowl a space or chamber 25 is provided, receiving clear liquor after passage through the several baskets, and this liquor may be discharged therefrom through pipes, passages or apertures 26 into a space or chamber 27 within the cover of the main bowl; passing thence to a delivery chamber 28 adjacent the axis of rotation, from which chamber it may pass through apertures 29 to a receiving chamber 30 from which it is discharged through a spout (shown by dotted lines) to any suitable point.

In the form of apparatus shown in Figs. 3 and 4, the bowl of the centrifugal is made of a shell 2ª having a bottom 3ª, which may be directly secured to the driving shaft 1ª, and a cover 5ª. In this construction the wall or shell 2ª of the bowl may be stayed by suitable annular bands 6 to prevent destruction under the action of centrifugal force. As in the other structure, the shell is preferably provided with lugs 7ª at the top of the same to engage flanges 8ª of the cover 5ª whereby the latter may be held in place; removal of such cover being permitted by slightly rotating the same to free its flanges from engagement with said lugs.

Within the main bowl a secondary bowl is placed, having a bottom 10ª spaced above the bottom 3ª, which bottom 10ª may be supported by vanes 14ª forming pockets to arrest the liquid delivered thereto and insure its subjection to the action of centrifugal force. The secondary bowl has a solid inner wall 12ª, preferably conical in shape; being inclined outwardly from top to bottom and having a plurality of vanes 13ª, and an outer perforated wall 15 spaced from the peripheral wall 2ª of the main bowl; such wall 15 being held in such spaced relationship by means of stay pieces or braces 16 to form a peripheral chamber 17.

Within the secondary bowl, in the space between the outer perforated wall 15 and the inner solid wall 12ª of the same, a plurality of reticulated or foraminous baskets 20ª are placed, which baskets are nested one within the other; the outer basket being stayed against destruction by centrifugal force by annular bands 21ª, while the other baskets are spaced apart and braced by stay pieces 22. The bracing or staying means 22 for the baskets may be in the form of annular bands which should be perforated for the free passage of the liquid being filtered or separated. The baskets may be inclined outwardly from top to bottom at substantially the same angle as the inner solid wall 12ª.

Each of the foraminous nested baskets may carry a layer of filtering medium, which may be filter cloth of the usual type, indicated at 23, which filtering media lie on the outside of said baskets and toward the point from which the liquor enters the same.

Between the innermost conical basket and the central solid wall 12ª of the secondary bowl, a space or chamber 25ª is provided receiving clear liquor after passage through the several baskets, and this liquor is discharged therefrom through pipes or passages 26ª into a space or chamber 27ª within the cover of the main bowl, passing thence to a delivery chamber 28ª adjacent the axis of rotation, from which chamber it may pass through apertures 29ª to a receiving chamber 30ª for delivery through a spout (shown by dotted lines) to any suitable point.

The liquor to be filtered is fed to the bowl of the centrifugal separator or filter from a centrally disposed hopper 31, passing into the central chamber of the structure and falling to the bottom thereof. As this chamber fills, it forms a hollow central passage with a liquid wall that is substantially vertical and of the diameter of the feed channel, and said liquid rises to the top of the main bowl. From this chamber in the structure shown in Figs. 1 and 2, the liquid passes through a series of openings 32 in the bottom 10 leading to the chamber between the wall 2 of the main bowl and the peripheral wall of the first basket.

In the structure shown in Figs. 3 and 4, I have also shown a special form of feed device for delivering the liquid to the chamber 17. This feed device may comprise a supplemental chamber 35 mounted on the bottom 3ª of the main bowl and having a foraminous or reticulated wall 35ª. The bottom of the space or chamber 17 between the wall 2ª of the main bowl and the perforated wall 15 of the supplemental bowl is closed, and feed pipes 36 lead from the chamber 35 to said space; liquid introduced into the lower part of the chamber having no other outlet must enter the supplemental chamber 35, and from the same will pass into the pipes 36. In the use of this feed device, partial separation may take place in the lower portion of the main bowl prior to the entrance of the liquid therein and clearer liquid will be delivered for passage to the separating chambers between the nest of foraminous baskets.

The several sets of foraminous baskets 20 or 20ª may be stayed in place and separated at top and bottom by means of rings 37, 37ª and 38, 38ª, respectively.

In the form of structure shown in Figs. 1 and 2, the rings 37 form the upper wall or partition of the several chambers formed between the walls of the foraminous baskets, while the rings 38, at the bottom may be seated in an annular groove 39 formed in the bottom 10 of the supplemental chamber.

In the form of structure shown in Figs. 3 and 4, the rings 37ª separating and spacing the baskets 20ª are disposed in an annular groove 40 on the under side of a plate 41 forming the top of the chamber receiving said baskets, while the lower rings 38ª may rest upon the bottom 10ª of the inner supplemental bowl.

The rotating structures may be inclosed by casings 42 or 42ª, which may be supported in any suitable manner (not shown); such casings having trough-shaped bottoms into which the bowls may drain when being washed; the wall 2 of the structure shown in Fig. 1, and the wall 2ª of the structure shown in Fig. 3, being apertured at 43; which apertures are closed by plugs 44, and the casings 42 and 42ª being provided with hand-holes 45 and 45ª, normally closed by pivotally mounted covers 46 and 46ª.

In some instances, the vanes 14 and 14ª may be omitted from the lower portion of the main bowl, and if desired, the feed chamber 35 may be provided with a greater number of outlets than those furnished by the three pipes shown in the drawings.

It will be noted that I have provided a series of floating filtering elements within a body of liquid in which the pressure of such liquid tends to move it in one direction while the centrifugal force acting in an opposite direction removes the heavier particles and throws them out of the path of the moving liquid.

While the tendency of centrifugal action is to hold the liquid under treatment in the outer chamber of the main bowl, the pressure due to the weight of the incoming liquid forces it to its only point of outlet, which is through the reticulated or foraminous walls.

of the several baskets 20 within the inner portion of the structure. The filtering liquid, flowing against the force of centrifugal action, will find its outlet through the outlet passages 26, 26ª in the manner indicated above. The result of this method of operation is that any and all solids in solution or suspended matter carried by the liquid is removed therefrom and held back by the foraminous baskets, whether provided with filtering media or not, and when the latter are used, such matter is removed therefrom by centrifugal action and deposited against the inner walls of the baskets 20, leaving the filter cloths absolutely clear and clean. By reason of this fact, it is possible to run the filter for a much greater period of time than would be otherwise possible, since the filter cloths do not require cleaning so often, and the solid matter will deposit in the bottom and outer portion of the structure.

In the use of filter cloths in carrying out the process forming the subject of my invention, such cloths are placed exteriorly of the foraminous or reticulated baskets and in action they tend to stand away from the same. As the liquid under treatment is constantly passing inward toward the axis of rotation and against the action of centrifugal force present, it passes successively through the filter cloths before passing to the chambers between the several baskets. These cloths forming the filtering media, may be said to float in the liquid under treatment which is being forced inward while the cloths are held outward by centrifugal force. The net result of this arrangement is that these cloths remain clean during the operation of the structure; any solids or other matter caught thereby from the passing liquid being thrown off by centrifugal force.

The speed of the cones or chambers formed thereby is an important feature of the invention in order to obtain the most perfect purification of the solution, but such speed will differ with the materials treated. In some instances, the first or inner basket might travel at a speed not less than 10,000 feet per minute and the outer basket at a speed not greater than 20,000 feet per minute, if a simple substance such as carbonate of lime is being treated, while for other materials, tan bark liquor or the like, much higher peripheral speeds would be necessary.

The apparatus is always full when in operation, and the essential feature of my invention is the working back (or inwardly) of the material under treatment by the pressure of its weight within the apparatus against the centrifugal force which tends to throw it out and which does carry away the solid material to be removed, but does not prevent the discharge of clear liquid at a point adjacent the axis of rotation.

While I have shown and described conical baskets, it will be understood that I may use vertical-walled baskets in some instances. The use of conical baskets facilitates their removal for cleaning purposes; a necessary operation at more or less frequent intervals, depending upon the character of the material operated upon.

To assist prompt passage of the discharging liquid to the chamber 28 and subsequent discharge from the machine, I preferably provide the upper portion of the supplemental bowl with vanes 48, which may be curved, and perform the function of a pump to move the liquid to said chamber 28.

The chambers formed between the several reticulated or foraminous baskets may be provided with vanes, as may be desired, to insure movement with the apparatus of the liquid treated.

I claim:

1. The process of treating liquids containing solids in suspension, which consists in passing a solid-containing liquid through a series of concentric rapidly rotating centrifugal chambers and toward the axis of rotation thereof, said chambers each having opposed walls perforated substantially throughout their extent and said chambers having successively decreasing rates of peripheral speed, the rotary and centrifugal action imparted to the liquid in one chamber being continued but in lesser degree in the next, and succeeding chambers, thereby separating from the liquid the suspended matter displaced in the several chambers and depositing said suspended matter on the inner surfaces of the walls of the chambers between the perforations thereof, and discharging the clear liquid adjacent the axis of rotation.

2. The process of treating liquids containing solids of differing specific gravity in suspension, which consists in passing a solid-containing liquid through a series of concentric centrifugal separating chambers and toward the axis of rotation thereof, said chambers each having opposed walls perforated throughout their extent and said chambers having successively decreasing rates of peripheral speed, the rate of peripheral speed of one chamber decreasing at different portions thereof, the centrifugal action imparted to the liquid in one chamber being continued but in lesser degree in the next and succeeding chambers, thereby separating from the liquid the suspended matter displaced by each chamber and at the same time depositing said suspended matter on the inner surfaces of the walls of the chambers between the perforations thereof, and discharging the clear liquid adjacent the axis of rotation.

3. The process of treating liquids, which consists in subjecting a liquid to a continuous rapid centrifugal action, in concentric chambers having opposed walls with perforations throughout their extent, said chambers successively and progressively decreasing the peripheral speed of said centrifugal action, thereby separating from the liquid and collecting on the inner walls of said chambers between the perforations thereof, the suspended matter displaced by centrifugal action at each stage of decrease of peripheral speed, whereby the liquid is freed at each stage from impurities not removable by centrifugal action at the progressively decreased peripheral speeds, and discharging the clear liquid adjacent the axis of rotation of the chambers.

4. The process of treating liquids, which consists in subjecting the same to rapid and continuous centrifugal action in concentric chambers having opposed walls with perforations throughout their extent, said chambers successively and progressively decreasing the peripheral speed of said centrifugal action, thereby separating in said chambers the liquid matter and at the same time depositing on the inner walls of the chambers between the perforations thereof the suspended matter displaced by centrifugal action at each stage of decrease of the peripheral speed, and passing said liquid at each successive decrease of peripheral speed through a filtering medium whereby the liquid is freed at each stage or change of peripheral speed from impurities not removable by centrifugal action at the progressively decreased peripheral speeds.

5. The process of treating solid-containing liquids, which consists in subjecting the same to continuous rotary and centrifugal actions in concentric chambers having opposed walls with perforations throughout their extent, said chambers rotating at different peripheral speeds, first increasing directly and then decreasing progressively, said peripheral speeds ranging from substantially 20,000 to substantially 10,000 feet per minute, thereby separating in said chambers the liquid under treatment, and at the same time depositing on the inner walls of the chambers between the perforations thereof the suspended matter displaced progressively, first at the increased and then at the decreased rates of peripheral speed, and discharging the clear liquor at a point adjacent the axis of rotation of said chambers.

6. In the process of recovering solids suspended in liquid solutions, the step of subjecting a solid-containing liquid continuously to a series of rapid rotary and centrifugal separating treatments in concentric chambers having opposed walls perforated throughout their extent, said chambers successively and progressively decreasing in peripheral speed to remove from the material the suspended solids and thereby depositing said solids on the portions of said inner walls between the perforations thereof, and discharging the clear liquid adjacent the axis of rotation of said chambers.

7. In the process of recovering solids suspended in liquid solutions, the step of subjecting the crude solution continuously to a series of centrifugal separating treatments in chambers having opposed walls perforated throughout their extent, said chambers successively and progressively decreasing in peripheral speed to remove from the material the suspended impurities, and thereby depositing said impurities on the portions of said walls between the perforations thereof, and passing the liquid through a filtering medium between the first and final separating treatments.

8. The process of filtering liquids containing solids and other matter in suspension, which consists in passing such liquid through a series of rapidly rotating centrifugal chambers, each successively inclosing all but its inclosing chambers, each chamber having a different and progressively lessened rate of peripheral speed, discharging the clear liquor from the innermost chamber, and passing the liquor through a filtering medium at each successive decrease of peripheral speed.

9. The process of filtering liquid solutions containing solids in suspension, which consists in passing such solutions through a series of separating or filtering chambers having successively decreasing rates of peripheral speed, the speed in each chamber decreasing toward the top of the same, and passing the liquid at each successive decrease of peripheral speed through a filtering medium.

10. The process of filtering solutions containing solids in suspension, which consists in passing the same to a chamber rotating at a high rate of speed, passing said liquid directly to a chamber having a peripheral speed greater than the first named chamber, thence passing such liquid to a plurality of concentric chambers having successively decreasing rates of peripheral speed, thereby separating from the liquid solution, suspended matter displaced in each chamber, filtering the liquid at each successive decrease of peripheral speed, and finally discharging the material from a chamber adjacent the axis of rotation.

11. The process of treating liquids containing solids in suspension, which consists in first delivering such liquid to a chamber having a high peripheral speed and there subjecting the same to centrifugal action, then passing such liquid through a plurality of concentric chambers in which the peripheral speeds thereof successively diminish toward the axis of rotation, passing the liquid at each successive decrease of peripheral speed through a filtering medium, and thereby separating from the liquid solution, suspended matter displaced in each chamber.

12. The process of treating liquids containing solids in suspension, which consists in passing the liquid to the center of a chamber having a high peripheral speed, delivering the liquid from the innermost chamber to an outer receiving chamber by centrifugal action, successively passing such material to other chambers having successively decreasing rates of peripheral speed the chambers being concentric, passing said liquid at each successive decrease of peripheral speed through a filtering medium, and finally discharging the liquid from a point adjacent the axis of rotation.

13. The process of filtering liquids containing solids in suspension, which consists in imparting continuous rotary action to such material at a high peripheral speed and then at a decreasing peripheral speed, passing such liquid at various stages of its decreased peripheral speed, through chambers having walls perforated throughout their extent, and then discharging the filtered liquid.

In testimony whereof, I have signed my name to this specification in the presence of two subscribing witnesses.

HARRY C. CHRISTIANSON.

Witnesses:
W. E. MACNAUGHTON,
ARTHUR FENNEL.